(12) United States Patent
Li et al.

(10) Patent No.: US 9,621,084 B2
(45) Date of Patent: Apr. 11, 2017

(54) THRUST COMPENSATION SYSTEM OF DUAL-WINDING VOICE COIL MOTOR

(71) Applicant: Harbin Institute Of Technology, Harbin (CN)

(72) Inventors: Liyi Li, Harbin (CN); Donghua Pan, Harbin (CN); Qingbo Guo, Harbin (CN); Chengming Zhang, Harbin (CN); Jiwei Cao, Harbin (CN)

(73) Assignee: HARBIN INSTITUTE OF TECHNOLOGY, Harbin (CN)

( * ) Notice: Subject to any disclaimer, the term of this patent is extended or adjusted under 35 U.S.C. 154(b) by 0 days.

(21) Appl. No.: 15/023,401

(22) PCT Filed: Sep. 9, 2014

(86) PCT No.: PCT/CN2014/086128
§ 371 (c)(1),
(2) Date: Mar. 20, 2016

(87) PCT Pub. No.: WO2015/043373
PCT Pub. Date: Apr. 2, 2015

(65) Prior Publication Data
US 2016/0211782 A1     Jul. 21, 2016

(30) Foreign Application Priority Data

Sep. 30, 2013    (CN) .......................... 2013 1 0460562

(51) Int. Cl.
*H02K 41/00*     (2006.01)
*H02P 7/025*     (2016.01)
(Continued)

(52) U.S. Cl.
CPC ......... *H02P 7/025* (2016.02); *H02K 41/0356* (2013.01); *H02P 25/034* (2016.02); *H02K 2213/03* (2013.01)

(58) Field of Classification Search
CPC ... H02P 7/025; H02P 25/034; H02K 41/0356; H02K 2213/03; H02K 41/02; H02K 41/0354
(Continued)

(56) References Cited

U.S. PATENT DOCUMENTS 4,967,293 A * 10/1990 Aruga .................. G11B 5/5565
                                                   360/246.7
5,032,776 A * 7/1991 Garagnon .............. G11B 5/553
                                                   318/611
(Continued)

FOREIGN PATENT DOCUMENTS

CN     101404438 A     4/2009
CN     101552530 A    10/2009
(Continued)

OTHER PUBLICATIONS

International Search Report and Written Opinion in related PCT Application No. PCT/CN2014/086128, mailing date Nov. 28, 2014.

*Primary Examiner* — Rita Leykin
(74) *Attorney, Agent, or Firm* — Troutman Sanders LLP; Ryan A. Schneider; Christopher C. Close, Jr.

(57) ABSTRACT

A thrust compensation system of a dual-winding voice coil motor, which is used for driving the voice coil motor having main windings (100) and secondary windings (200), wherein the secondary windings (200) of the voice coil motor are between each pair of the main windings (100). The system includes a switch drive circuit of the main windings (800) which is powered by a first controlled voltage source to drive the main windings (100) adopted as the main working windings of the voice coil motor and used for providing the output electromagnetic force required by the driving system of the voice coil motor in work; a switch drive circuit of the secondary windings (900) which is powered by a second voltage source to drive the secondary (Continued)

windings (200) adopted as compensation windings, and used for providing the thrust ripple opposite to the main windings (100) so as to compensate the thrust ripple of the main windings (100) and keep the resultant force of the output of the main windings (100) and the secondary windings (200) of the voice coil motor in constant; wherein the voltages $U_{dc1}$ and $U_{dc2}$ of the first and second controlled voltage sources of the main windings (100) and the second windings (200) are configured as meeting a certain relationship.

13 Claims, 12 Drawing Sheets

(51) Int. Cl.
  *H02P 25/034* (2016.01)
  *H02K 41/035* (2006.01)
(58) Field of Classification Search
  USPC ... 318/135, 119, 118; 310/10, 15, 12.01, 36, 310/12.17, 12.08, 12.16
  See application file for complete search history.

(56) References Cited

U.S. PATENT DOCUMENTS

| | | | | |
|---|---|---|---|---|
| 5,245,232 A * | 9/1993 | Nihei | G11B 7/08582 | 310/12.08 |
| 5,325,247 A * | 6/1994 | Ehrlich | G11B 5/59622 | 318/611 |
| 5,606,468 A * | 2/1997 | Kodama | G11B 5/59616 | 360/137 |
| 5,612,833 A * | 3/1997 | Yarmchuk | G11B 5/5534 | 360/29 |
| 5,654,840 A * | 8/1997 | Patton | G11B 5/59694 | 318/601 |
| 5,663,847 A * | 9/1997 | Abramovitch | G01P 15/08 | 360/75 |
| 6,005,747 A | 12/1999 | Gilovich | | |
| 6,011,373 A * | 1/2000 | McConnell | G05B 5/01 | 318/560 |
| 6,101,062 A * | 8/2000 | Jen | G11B 5/5582 | 360/75 |
| 6,144,181 A * | 11/2000 | Rehm | G05B 5/01 | 318/609 |
| 6,624,720 B1 * | 9/2003 | Allison | H01P 1/127 | 333/105 |
| 6,643,080 B1 * | 11/2003 | Goodner, III | G11B 21/02 | 360/31 |
| 6,650,554 B2 * | 11/2003 | Darshan | H02H 9/001 | 323/207 |
| 6,674,601 B1 * | 1/2004 | Ho | G11B 21/02 | 360/75 |
| 6,707,269 B2 * | 3/2004 | Tieu | H02P 6/085 | 318/592 |
| 6,735,038 B2 * | 5/2004 | Hill | H02P 25/034 | 318/560 |
| 6,765,749 B2 * | 7/2004 | Galloway | G11B 5/59605 | 360/77.02 |
| 6,771,455 B1 * | 8/2004 | Yatsu | G11B 5/5526 | 360/75 |
| 7,209,311 B2 * | 4/2007 | Ueda | G11B 5/596 | 360/77.06 |
| 7,374,544 B2 * | 5/2008 | Freeman | A61B 5/15178 | 600/564 |
| 7,474,494 B2 * | 1/2009 | Atsumi | G11B 5/59605 | 360/77.02 |
| 7,619,844 B1 * | 11/2009 | Bennett | G11B 5/5547 | 360/75 |
| 7,626,781 B2 * | 12/2009 | Konishi | G11B 5/5582 | 360/77.02 |
| 7,648,468 B2 * | 1/2010 | Boecker | A61B 5/15151 | 600/583 |
| 7,679,856 B2 * | 3/2010 | Ishiguro | G11B 5/5582 | 360/75 |
| 7,723,937 B2 * | 5/2010 | Kurosawa | G11B 19/2054 | 318/400.32 |
| 7,796,410 B2 * | 9/2010 | Takayanagi | H02J 7/0013 | 307/66 |
| 7,800,922 B2 * | 9/2010 | Takayanagi | H02M 1/10 | 323/251 |
| 8,134,437 B2 * | 3/2012 | Brooks | H01F 7/1607 | 335/100 |
| 8,134,438 B2 * | 3/2012 | Brooks | H01F 7/1607 | 335/100 |
| 8,392,000 B2 * | 3/2013 | Levin | G05B 19/41835 | 455/73 |
| 8,860,338 B2 * | 10/2014 | Shimazaki | H02P 25/028 | 318/135 |
| 8,870,865 B2 * | 10/2014 | Frankhouser | A61B 10/025 | 600/587 |
| 9,105,281 B2 * | 8/2015 | Kadlec | G11B 7/08529 | |
| 9,401,168 B1 * | 7/2016 | Ito | G11B 5/5552 | |
| 2005/0111125 A1 * | 5/2005 | Chung | G01H 13/00 | 360/31 |
| 2012/0209303 A1 * | 8/2012 | Frankhouser | A61B 10/025 | 606/169 |
| 2013/0072857 A1 * | 3/2013 | Frankhouser | A61B 10/025 | 604/22 |

FOREIGN PATENT DOCUMENTS

| | | |
|---|---|---|
| CN | 101572472 A | 11/2009 |
| CN | 103595330 A | 2/2014 |

\* cited by examiner

THRUST COMPENSATION SYSTEM OF DUAL-WINDING VOICE COIL MOTOR

CROSS-REFERENCE TO RELATED APPLICATIONS

This application is a US National Stage of International Application No. PCT/CN2014/086128, filed 9 Sep. 2014, which claims the benefit of CN201310460562.X, filed 30 Sep. 2013, each herein fully incorporated by reference.

TECHNICAL FIELD

The invention relates to a voice coil motor, in particular to a voice coil motor having thrust compensation function and a corresponding drive circuit.

BACKGROUND OF THE INVENTION

The voice coil motor (VCM) is a motor designed according to Lorentz force theory and used for directly switching the electrical signal into the beeline displacement without any intermediate switching mechanism. Compared with other motors, the voice coil motor has a plurality of advantages, such as simple structure, small volume, light weight, low inertia and larger than thrust, etc., so that it has broad application prospects, which is mainly applied to the positioning systems with high precision, high frequency excitation, speediness and high acceleration, optics and measurement systems, optical assembly and aviation.

At present, the design scheme of the servo drive controller of the voice coil motor in the ultra-high precision servo control field is divided into linear power amplifier scheme and PWM (pulse width modulation) power converter scheme. When the ultra-high precision servo system adopts the linear power amplifier scheme to design, the current response is fast, the thrust ripple of the system produced by the on-off chopped wave of the switch is eliminated, and the stability of the output thrust is improved. But when the system adopts the linear power amplifier scheme, firstly the current response has overshoot problem and the nonlinear region while the current leaps. Secondly the design of the controller is greatly limited, and the high performance is difficult to control. When the ultra-high precision servo system adopts the linear power amplifier scheme to design, heat dissipated by the system components is large, and more energy is lost. One of the important development directions of the ultra precision positioning servo system is high overload and high acceleration, undoubtedly the power grade requirement of the element is higher, so that the linear power amplifier scheme is increasingly difficult to meet the power requirements of the ultra-high precision servo control system.

But when the ultra-high precision servo system adopts the PWM power converter scheme to design, because the control signal of the system is controlled by a digital processing unit, the design of the control system of the servo control system of the voice coil motor is more flexible, the drive performance of the system can be controlled by using more complex control methods, at the same time, the system has the advantages of fast response speed and high efficiency. But the PWM power converter scheme has some shortcomings. Firstly because the on-off chopped wave of the switch inevitably produces the current ripple in the system, and then the thrust ripple (the thrust ripple produced by the on-off chopped wave of the switch in the system is generally called thrust ripple below) caused by the current ripple greatly influences the control performance of the servo drive control system of the ultra-high precision voice coil motor. Secondly when the system adopts the PWM power converter scheme, the dead time set for preventing the direct connection of the upper and lower bridge arms of the switch circuit causes the instability phenomenon in the drive system.

At present, to reduce the thrust ripple produced in the system in the PWM power converter scheme, the high switching-frequency drive method is accepted. For example, to reduce the thrust ripple, the designer ascends the switching frequency of the switch to 200 kHz, at the moment, compared with the 10 kHz switching frequency adopted by the drive control system of the traditional servo motor, the thrust ripple of the system is reduced to 5% of original, but at the same time, because the switching frequency of the switch is ascended 20 times from the original, the switching loss of the switch is ascended 20 times from the original, simultaneously because the switching frequency of the switch ascends, the requirements of the switch are improved, and the cost of the drive system is increased. If the switching frequency is ascended, the control difficulty of the control system and the design difficult of the drive circuit of the drive system rise, and the stability of the system is greatly reduced.

In accordance with the former analysis, when the servo control system of the voice coil motor adopts the traditional PWM power converter scheme, the system structure sketch thereof is shown in FIG. 13; because of the on-off chopper wave of the switch of the system, current ripple produces in the main windings, which causes the output thrust ripple of the servo system of the voice coil motor.

The traditional servo adopts the switching frequency below 10 kHz, and the output thrust of the servo drive system of the voice coil motor is shown in FIG. 14A through FIG. 14C.

As shown in FIG. 14A through FIG. 14C, the servo system of the voice coil motor is in the small thrust output state, the range of the output thrust ripple of the system is 9.3398N-3.3324N, the average output thrust is 6.3361N, and the peak value of the output thrust ripple is 6.0074N.

In accordance with the current conventional method for solving the output thrust ripple of the system, when the switching frequency of the drive circuit of the system is increased to 200 kHz, the simulation waveform of the output thrust of the system is shown in FIG. 15A through FIG. 15C.

It is observed that the fluctuation range of the output thrust of the system is 6.9954N-6.6935N when the switching frequency of the drive circuit of the system is increased to 200 kHz, the peak value of the output thrust ripple is 0.3019N, and the output thrust ripple is reduced to 5% of original compared with the 10 kHz switching frequency.

SUMMARY OF THE INVENTION

Based on the influence of the system applied by the thrust ripple when the servo drive control system of the voice coil motor in the ultra-high precision servo control field adopts the PWM power converter control scheme, the following scheme is designed in this invention to effectively reduce the thrust ripple of the system by continuously improving the PWM switching frequency when the system adopts the PWM power converter control scheme, improve the working performance of the system, reduce the design difficulty of the drive circuit of the system and strengthen the stability of the system, and reduce the system loss.

One purpose of this invention is to overcome the shortcomings of the current technology, provide a new system for eliminating or avoiding the influence of the system applied by the thrust ripple which is produced when the system adopts the PWM power converter control scheme.

Based on the purpose above, the invention discloses a thrust compensation system of a dual-winding voice coil motor, including a voice coil motor, wherein the voice coil motor includes main windings, a magnetic steel and a permanent magnet, and further includes secondary windings arranged between a pair of main windings of the voice coil motor; the main windings are the main working windings of the voice coil motor, driven by a switch drive circuit of the main windings which is powered by an independent controlled voltage source, and used for providing the electromagnetic force required by the driving system of the voice coil motor in work; the secondary windings are compensation windings, driven by a switch drive circuit of the secondary windings which is powered by one independent controlled voltage source, and used for providing the thrust ripple opposite to the main windings so as to compensate the thrust ripple of the main windings and then keep the resultant force of the output of the main windings and the secondary windings of the voice coil motor in constant;

wherein the voltages $U_{dc1}$ and $U_{dc2}$ of the controlled voltage sources of the main windings and the second windings meet $$U_{dc2} = \frac{\frac{K_{f1}}{K_{f2}} \cdot L_2 + M}{L_1 + \frac{K_{f1}}{K_{f2}} \cdot M} U_{dc1}$$

wherein the parameters of the secondary windings meet the following relation:

$$R_2 = R_1 \frac{L_2 + \frac{K_{f2}}{K_{f1}} \cdot M}{L_1 + \frac{K_{f1}}{K_{f2}} \cdot M}$$

in the formula,
$U_{dc1}$ stands for the voltage value of the power supply of the drive circuit of the main windings;
$U_{dc2}$ stands for the voltage value of the power supply of the drive circuit of the secondary windings;
$R_1$ stands for the resistance value of the main windings;
$R_2$ stands for the resistance value of the secondary windings;
$L_1$ stands for the self-inductance value of the main windings;
$L_2$ stands for the self-inductance value of the secondary windings;
M stands for the mutual inductance value of the main windings and the secondary windings;
$K_{f1}$ stands for the thrust coefficient of the main windings;
$K_{f2}$ stands for the thrust coefficient of the secondary windings;

Preferably the size of the resistance R2 of the secondary windings is adjustable, so that the thrust ripple of the system can be perfectly reduced while the big average thrust can be kept at the same time.

The system can be switched into different work modes by adjusting the resistance value of $R_2$ to apply to different application environments.

What's further, the value of the resistance $R_2$ of the secondary windings is proportional to the resistance value $R_1$ of the main windings.

Preferably the ratio of the resistance R2 of the secondary windings to the resistance value R1 of the main windings is proportional to the ratio of the inductance value of the secondary windings to the inductance value of the main windings, and the proportion factor is larger than 1.

Preferably drive circuits of the main windings and the secondary windings are H-shaped full-bridge drive circuits.

In this invention, the synthetic output thrust produced by the main windings and the second windings of the servo system of the voice coil motor is kept in constant, so the high precision servo control of the voice coil motor is realized when the system is under the low switching frequency, the flexibility of the system control is improved, the control system can use a plurality of complex intelligent control strategies, the control performance of the system is effectively improved, the stability of the drive control system is improved, and the cost of the drive controller is reduced.

BRIEF DESCRIPTION OF THE DRAWINGS

FIG. 11A through FIG. 11C are thrust simulation waveform diagrams of the main windings and the secondary windings in the embodiment 2, wherein FIG. 11A is an overall result diagram of the output thrust simulation of the system, FIG. 11B is a partial enlarged view of the simulation results of the output thrust of the system between 0 and 0.001 s, and FIG. 11C is the partial enlarged view of the simulation results of the output thrust of the system between 0.015 s and 0.016 s

DESCRIPTION OF THE PREFERRED EMBODIMENT

To overcome the influence of the servo performance of the system caused by the thrust ripple produced when the servo drive control system of the voice coil motor in the current ultra-high precision servo control field adopts the PWM power converter scheme, the invention provides a new voice coil motor structure and a drive control scheme of the corresponding servo drive control system. In the scheme, the thrust ripple of the servo system of the voice coil motor is greatly reduced, the ultra-high precision control of the servo drive control system of the voice coil motor when the system is in the low switching frequency, the stability of the system is improved, the system loss is reduced, and the cost of the drive controller is greatly reduced.

In the invention, the technical scheme for solving the technical problems thereof is as follows: an auxiliary secondary compensation winding at the other side of the main winding of the voice coil motor, and then the secondary winding produces the thrust ripple completely opposite to the main winding, so that the thrust ripples produced by the main windings and the secondary windings of the voice coil motor can be canceled each other out through the secondary windings. In the PWM power converter scheme, the synthetic output thrust produced by the main windings and the secondary windings of the servo system of the voice coil motor is constant, so that the ultra-high precision servo control of the voice coil motor in the low switching frequency is realized, the flexibility of the system control is enhanced, the control system can use multiple complex intelligent control strategies, the control performance of the system is effectively improved, the stability of the drive control system is improved, and the cost of the drive controller is reduced.

Figure 1:
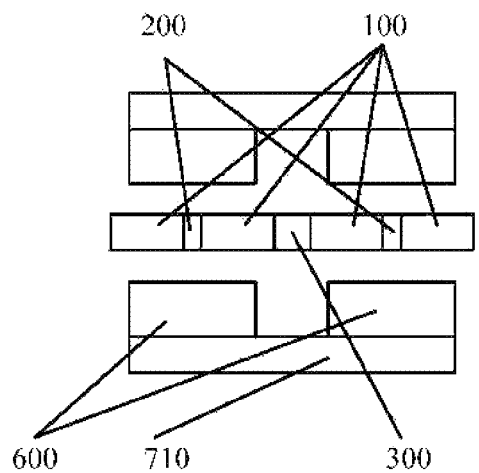
FIG. 1 takes the antipode dual windings as example to show a structure diagram of the dual-winding voice coil motor in the invention.

FIG. 1 takes the antipode dual windings as example to show a structure diagram of the dual-winding voice coil motor in the invention. In the normal motor windings, the other set of windings are added to the main windings 100, namely the secondary windings 200, so that the amplitudes of the thrust change produced by the secondary windings 200 of the motor and the thrust ripple produced by the main windings 100 are the same and the directions are opposite, and then the thrust ripple of the motor is suppressed so that the system has higher positioning precision.

The distribution and the design of the main and secondary windings 100, 200 are related to the electrical time constant of each set of the windings required by the drive control system and the distribution of the air-gap field of the motor.

The winding method of the windings 100, 200 is divided into the layered type or the joint filling type. For example, FIG. 2A through FIG. 2D show the two structures of the layered type, wherein FIG. 2A and FIG. 2B are the layering schematic view of the internal and external layers of the main windings and the secondary windings, FIG. 2C and FIG. 2D are the layering schematic view of the upper and lower layers of the main windings and the secondary windings.

Figure 2A:
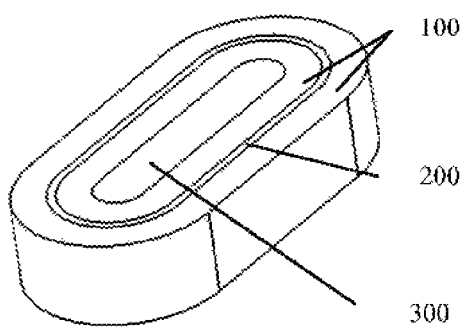
FIG. 2A is an internal and external winding of the main windings and the secondary windings.
Figure 2B:
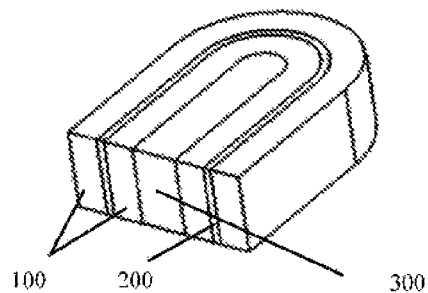
FIG. 2B is an internal and external winding profile of the main windings and the secondary windings.

As shown in FIG. 2A and FIG. 2B, the secondary windings 200 are enclosed between the two layers of the main windings 100, and the main windings at the internal side are enclosed on the external layer of the winging pillar 300.

Figure 2C:
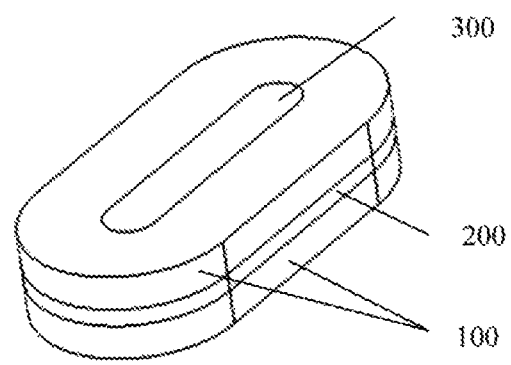
FIG. 2C is an upper and lower winding stereogram of the main windings and the secondary windings.
Figure 2D:
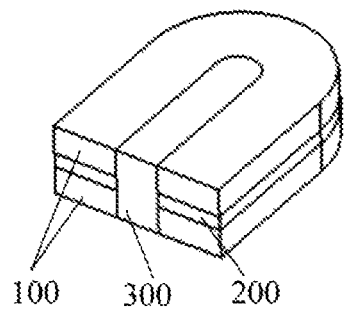
FIG. 2D is an upper and lower winding profile of the main windings and the secondary windings.

As shown in FIG. 2C and FIG. 2D, the secondary windings 200 are clamped between the upper layer and the lower of the main windings 100, and the winging pillar 300 passes through the upper layer of the main winding, the secondary windings and the lower layer of the main winding from upside to downside.

Figure 3A:
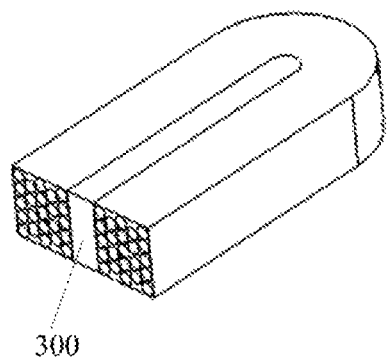
FIG. 3A is a joint filling type winding schematic view of the main windings and the secondary windings
Figure 3B:
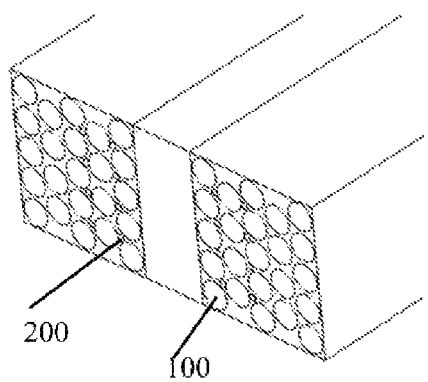
FIG. 3B is an enlarged view of FIG. 3A
Figure 3C:
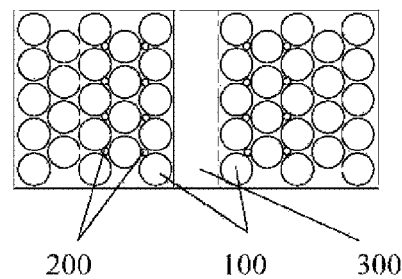
FIG. 3C is an end surface view of FIG. 3A

FIG. 3A through FIG. 3C show the winding method of the joint filling type main windings and secondary windings. In the special design requirements, the diameters of the enamelled wires of the secondary windings 200 are small, so the enamelled wires of the secondary windings 200 can be filled in the joints of the main windings 200.

Figure 4A:
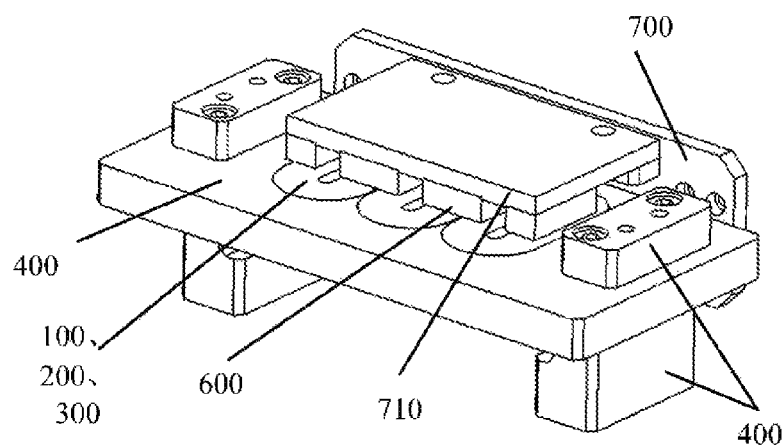
FIG. 4A is a schematic view of the multi-polar dual-winding voice coil motor.
Figure 4B:
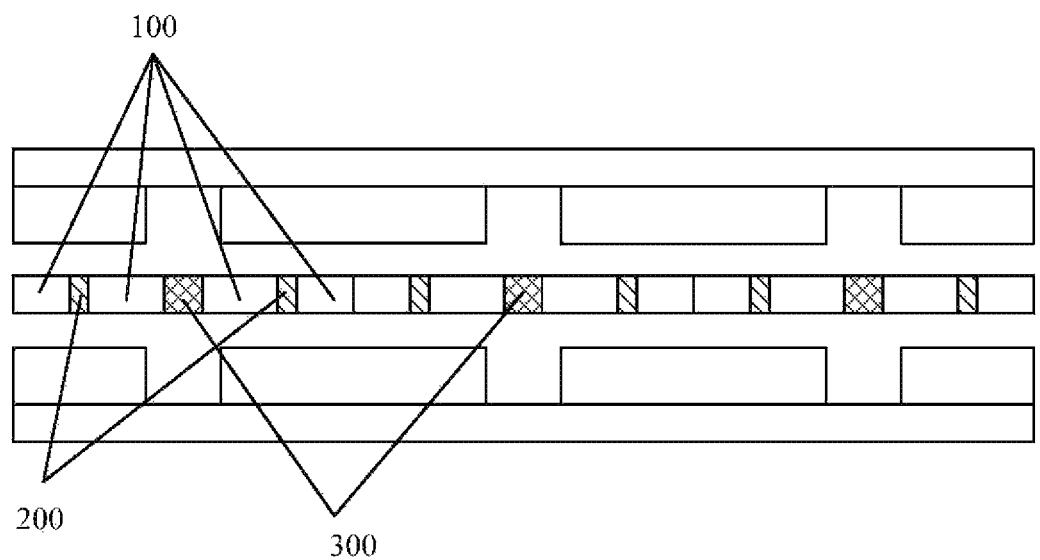
FIG. 4B is a schematic view of the multi-polar dual-winding voice coil motor.

FIG. 4A and FIG. 4B show a schematic diagram of the multi-polar dual-winding voice coil motor. The primary windings (100, 200, 300) of the motor are encapsulated in the primary support plate 400 through the epoxy glue, the primary support plate is supported through the primary support pedestal 500. The secondary magnetic steel 600 is connected with the secondary support structure 700 through the yoke plate 710. The structure above forms the complete structural style of the motor.

Figure 5A:
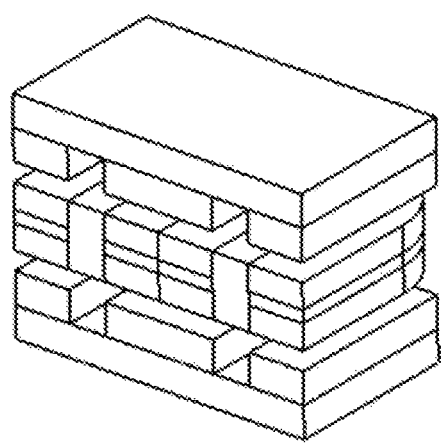
FIG. 5A shows the relationship of the upper and lower winding method of the main windings and the secondary windings to the settings of the magnetic steel and the permanent magnet.
Figure 5B:
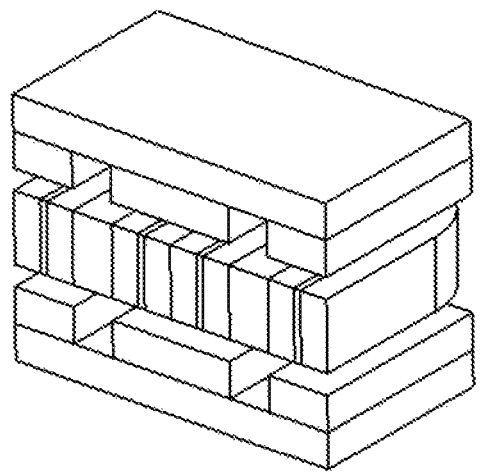
FIG. 5B shows the relationship of the internal and external winding method of the main windings and the secondary windings to the settings of the magnetic steel and the permanent magnet.

FIG. 5A and FIG. 5B respectively show the position relationship of the internal, external, upper and lower windings obtained by winding in layers in different forms to the magnetic steel and the permanent magnet.

Figure 6:
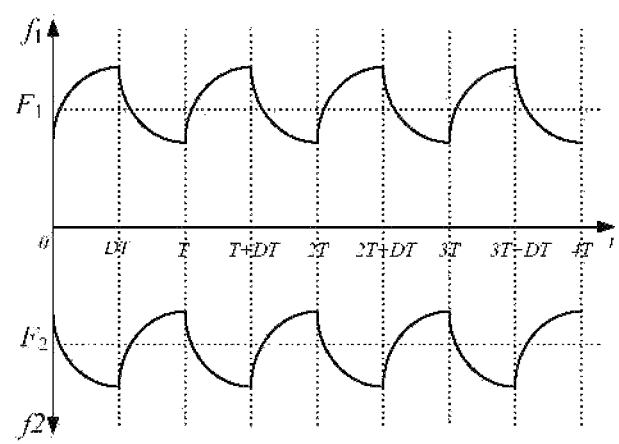
FIG. 6 is a matching relationship view of the output thrust of the main windings and the output thrust of the secondary windings

In the scheme of the invention, the secondary windings 200 are electrified after introduced to the voice coil motor so as to produce the thrust ripple opposite to the main windings 100, therefore the thrust ripple of the main windings can be compensated. The wavelength theory of the thrust ripple applied on the main windings 100 by the secondary windings 200 is shown in FIG. 6.

Next, embodiments implementing the drive circuit of the first dual-winding voice coil motor are described in details.

Figure 7:
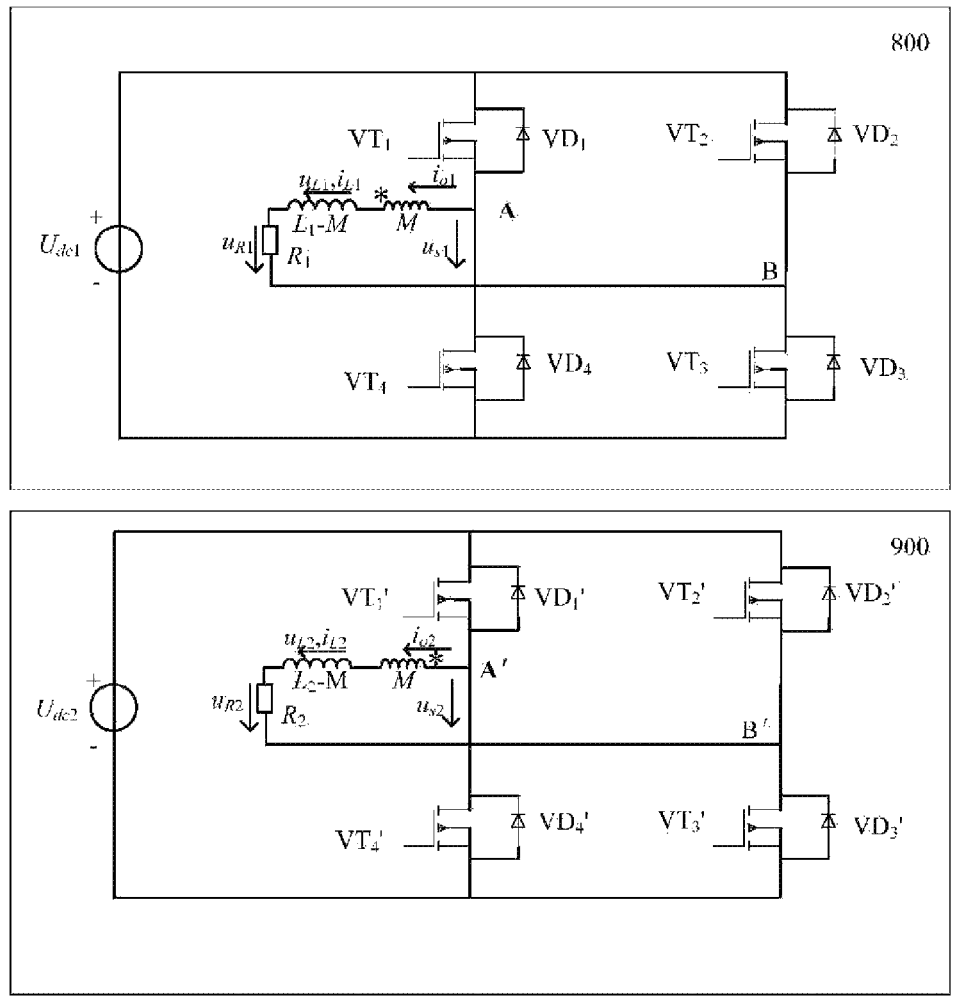
FIG. 7 is a drive control schematic diagram of the dual-winding thrust compensation system in the embodiment 1

As shown in FIG. 7, the drive circuit of the dual-winding voice coil motor in the embodiment 1 is as follows: the main-winding drive circuit and the secondary-winding drive circuit 800, 900 of the main windings 100 and the secondary windings 200 adopt the traditional H-shaped full-bridge drive circuit. The two sets of the drive circuits 800, 900 use the semiconductor power devices which are completely the same; at the same time, the drive signals of the semiconductor power devices are completely the same, so that the drive circuits of the main windings and the secondary windings can be synchronously switched on and off, namely the output thrust of the main windings and the output thrust of the secondary windings can be ascended and descended synchronously.

Based on the guarantee that the output thrust of the main windings and the output thrust of the second windings are ascended and descended synchronously, to completely compensate the thrust ripple of the main windings applied by the secondary windings, the secondary windings need to produce the thrust ripple of which the size is the same as the main windings and the direction is opposite at any time. Because the output thrust of the main winding is proportional to the current of the main windings, the proportion factor is the thrust coefficient $K_{f1}$ of the main windings; because the output thrust of the secondary windings is proportional to the current of the secondary windings, the proportion factor is the thrust coefficient $K_{f2}$ of the main windings. To compensate the thrust ripple of the main windings by the thrust ripple of the secondary windings a any time, the current ripple of the main windings is effectively compensated by adjusting the current ripple of the secondary windings. After the differential equations of the main windings and the secondary windings in different states are analyzed, in the condition that the inductances L1, L2 of the main windings and the secondary windings of the voice coil motor are definite, the voltage values $U_{dc1}$ and $U_{dc2}$ of the DC voltage sources of the main-winding drive circuit 800 and the secondary-winding drive circuit 900 mainly influence peak-to-peak value of the current ripple of the windings within the switching-on or off period of the drive circuit, and the resistances $R_1$, $R_2$ of the windings mainly influence the current change trend of the windings within the switching-on or off period of the drive circuit.

To ensure that the secondary windings 200 can completely compensate the thrust ripple of the main windings 100 at any time, in accordance with the solution of the differential equations of the main windings 100 and the secondary windings 200, the resistance $R_2$ of the secondary windings 200 can be obtained, and the voltage $U_{dc2}$ of the DC voltage source of the drive circuit of the secondary windings shall meet the conditions below.

$$U_{dc2} = \frac{\frac{K_{f1}}{K_{f2}} \cdot L_2 + M}{L_1 + \frac{K_{f1}}{K_{f2}} \cdot M} U_{dc1} \quad \text{Formula 1.1}$$

$$R_2 = R_1 \frac{L_2 + \frac{K_{f2}}{K_{f1}} M}{L_1 + \frac{K_{f1}}{K_{f2}} M} \quad \text{Formula 1.2}$$

in the formula,
$U_{dc1}$ stands for the voltage value of the power supply of the drive circuit of the main windings;
$U_{dc2}$ stands for the voltage value of the power supply of the drive circuit of the secondary windings;
$R_1$ stands for the resistance value of the main windings;
$R_2$ stands for the resistance value of the secondary windings;
$L_1$ stands for the self-inductance value of the main windings;
$L_2$ stands for the self-inductance value of the secondary windings;
M stands for the mutual inductance value of the main windings and the secondary windings;
$K_{f1}$ stands for the thrust coefficient of the main windings;
$K_{f2}$ stands for the thrust coefficient of the secondary windings;

The secondary windings and the drive circuit thereof can be designed according to formulae (1.1) and formula (1.2), so that the dual-winding thrust compensation system can eliminate the ripple of the output thrust, realize the design target that the output resultant force of the main windings and the secondary windings is kept in constant, and improve the servo working performance of the system.

Figure 8A:
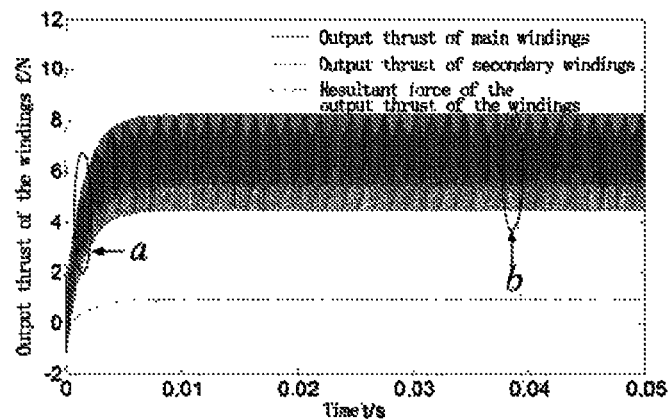
FIG. 8A through FIG. 8C are thrust simulation waveform diagrams of the dual-winding thrust compensation system in the embodiment 1 of the invention, wherein FIG. A is an overall result diagram of the output thrust simulation of the system, FIG. B is a partial enlarged view of the simulation results of the output thrust of the system between 0.001 and 0.003 s, and FIG. C is the partial enlarged view of the simulation results of the output thrust of the system between 0.038 s and 0.04 s
Figure 8B:
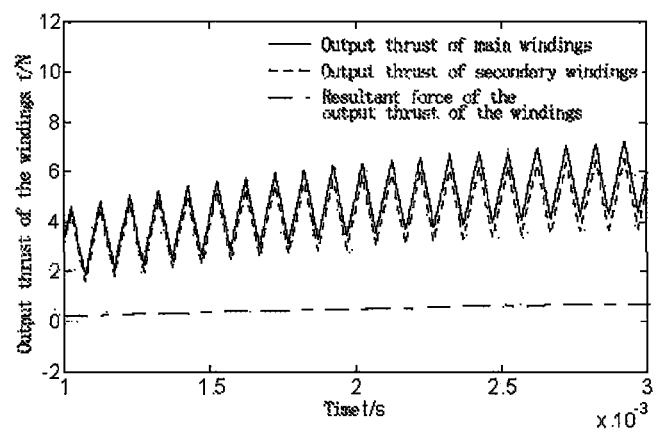
Figure 8C:
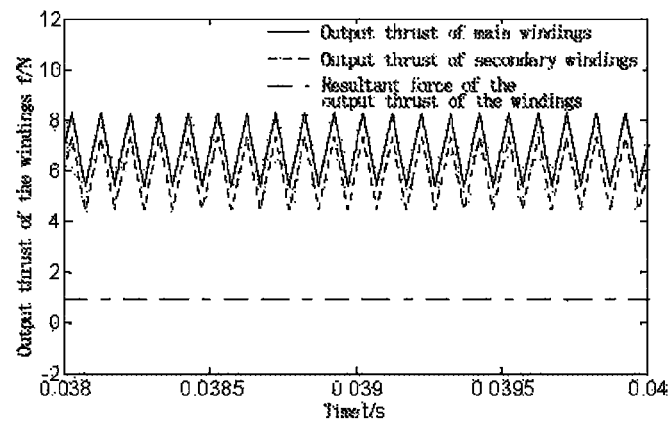

When adopting the dual-winding thrust compensation system designed in the embodiment 1, the drive circuit of the system adopts the 10 kHz switching frequency used by the conventional servo system, at the moment, the thrust simulation waveform of the system is shown in FIG. 8A through FIG. 8C.

As shown in the simulation waveform diagrams, the secondary windings can effectively compensate the output thrust of the main windings, so that the output thrust ripple of the servo drive system of the voice coil motor is greatly reduced, and the resultant force of the output thrust of the main windings and the secondary windings can be kept in constant. As shown in the partial enlarged views FIGS. 9A and 9B, the fluctuation range of the output thrust of the main windings is 8.2599N-5.4239N, and the peak-to-peak value of the output ripple is 2.836N. The resultant force fluctuation range of the output thrust of the main windings and the secondary windings is 0.9443N-0.9371N, and the peak-to-peak value of the output ripple is 0.0072N. Seen from the diagrams, the secondary windings adopted in the embodiment 1 effectively compensate the thrust ripple of the main windings; after adopting the dual-winding system, the fluctuation of the resultant force of the output thrust of the main windings and the secondary windings is 0.25% of the thrust ripple of the main windings, so that the output thrust ripple of the voice coil motor in the low switching frequency (10 kHz) can be more effectively reduced, and the control performance and the work precision of the servo system of the voice coil motor are improved. Compared with the high switching frequency (200 kHz) drive scheme of the traditional voice coil motor, in the embodiment 1, the system loss and the control difficulty are reduced, the drive control performance of the system is improved, the stability and the reliability of the system are improved, and the system cost is reduced.

Figure 9A:
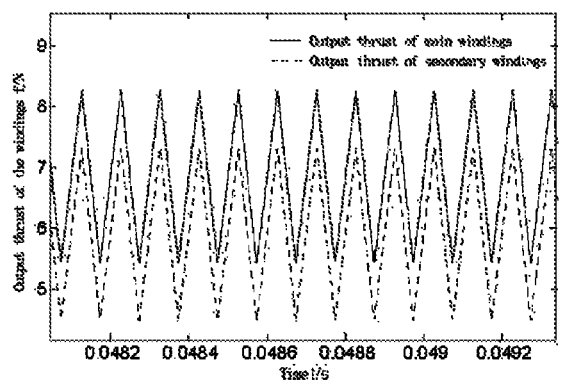
FIG. 9A is a partial enlarged view of the output thrust of the main windings and the secondary windings based on the embodiment 1
Figure 9B:
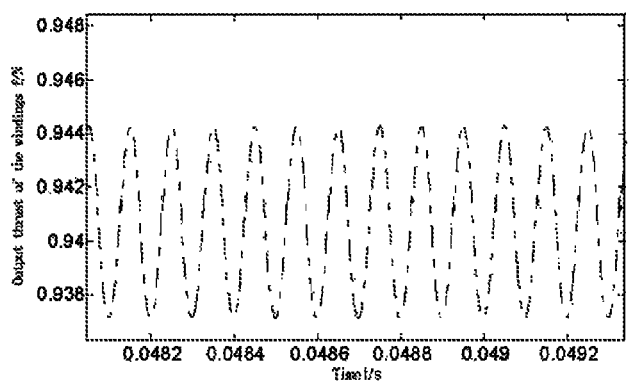
FIG. 9B is a resultant force simulation diagram of the output thrust of the main windings and the secondary windings based on the embodiment 1

But the embodiment still has some shortcomings. As shown in FIG. 9A and FIG. 9B, compared with the average output thrust (called average thrust hereinafter) 6.8419N of the main windings within one switching-on and off period, the output thrust of the voice coil motor having the dual-winding thrust compensation in the embodiment only remains 0.9407N, so that the average thrust of the main windings is reduced to a certain extent while the secondary windings in the embodiment of the invention compensate the thrust ripple of the main windings.

In this way, when the servo system of the voice coil motor is applied to the ultra-high precision servo field, because of the steep requirements of the output thrust ripple of the motor, the parameters of the driver must be precisely designed according to the driver parameter design formula (1.1) and (1.2) discussed in the embodiment, therefore, the servo system of the voice coil motor can obtain the smallest thrust ripple, which may cause large design workload.

As the improvement of the scheme in the embodiment, the second embodiment is described in the invention.

In the embodiment, when the requirements of the output thrust ripple of the voice coil motor required by the application fields and occasions of the servo system of the voice coil motor are not particularly harsh, if the parameter design of the secondary windings of the motor in the embodiment 1 is changed, the reduction of the average thrust of the main windings applied by the secondary windings is reduced while the compensation effect of the thrust ripple of the main windings applied by the secondary windings, so that a new balance point of the resultant force of the output thrust of the main windings and the secondary windings of the voice coil motor is obtained between the thrust ripple and the average thrust: the thrust ripple is perfectly reduced, and the large average thrust is remained.

Seem from the analysis above, in the dual-winding motor system, the thrust ripple of the windings is proportional to the current ripple of the windings, and the average output thrust of the windings is proportional to the average current of the windings. In the dual-winding thrust compensation system shown in the embodiment, the voltage values of the DC voltage sources $U_{dc1}$ and $U_{dc2}$ of the drive circuits 800, 900 of the windings mainly influence the peak-to-peak value of the current ripple of the windings within the switching-on or off period of the drive circuit, and the resistances $R_1$, $R_2$ of the windings mainly influence the current change trend of the windings within the switching-on or off period of the drive circuit. So when the resistance $R_2$ of the secondary windings 200 and the power supplies of the drive circuits are designed according to formulae (1.1) and (1.2), the secondary windings 200 can perfectly compensate the thrust ripple of the main windings at any time.

But the result is that the average thrust is greatly reduced while the secondary windings greatly reduces the thrust ripple of the main windings. The reduction degree of the average thrust of the main windings applied by the secondary windings is greatly influenced by the resistance $R_2$ of the secondary windings and the voltage $U_{dc2}$ of the drive circuit of the secondary windings.

So based on the applications that the requirements of the output thrust ripple of the voice coil motor required by the application fields and occasions of the servo system of the voice coil motor are not particularly harsh, in the embodiment, the embodiment 1 is improved by compromise, namely in the condition that the voltage $U_{dc2}$ of the drive circuit of the secondary windings is not changed, by a manner of adjusting the resistance $R_2$ of the secondary windings, the big average thrust can be remained in the system while the thrust ripple is reduced.

Figure 10:
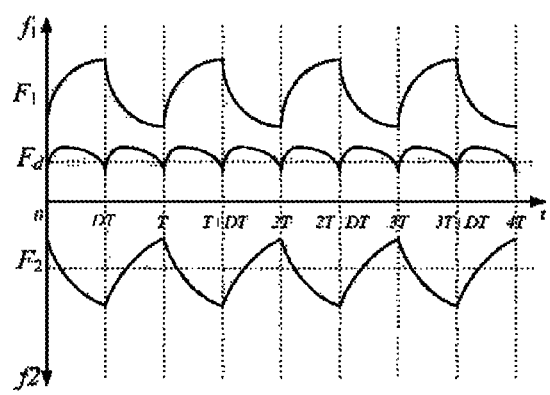
FIG. 10 is an output thrust schematic view of the main windings and the second windings

At the moment, the schematic view of the output thrust of the main windings and the secondary windings is shown in FIG. 10.

As shown in FIG. 10, because the power supply Udc2 of the drive circuit of the secondary windings is not changed, the secondary windings still can perfectly compensate the thrust ripple of the main windings on the peak or trough of the thrust ripple of the main windings. At other moments, after FIG. 10 is compared with FIG. 6, the resistance $R_2$ of the secondary windings 200 is changed, the change trend of the thrust ripple of the secondary windings 200 is changed, which is not equal and opposite to the thrust ripple of the main windings at any time, so that the ability to compensate the thrust ripple of the main windings is reduced. But at the same time, as shown in FIG. 10, the average thrust of the main windings applied by the secondary windings is reduced, so a compromise balance is obtained: the system remains big average thrust while perfectly reducing the thrust ripple.

After the state equations of the dual-winding system in the embodiment 1 are analyzed and solved, in the condition that the power supply $U_{dc2}$ of the drive circuit of the secondary winding meets the formula (1.1), the resistance $R_2$ of the secondary windings can be adjusted according to the method shown in the formula (1.3), $$R_2 = AR_1 \frac{L_2}{L_1} \quad \text{Formula 1.3}$$

in the formula, A>1.

At the moment, in the condition that the requirements of the output thrust ripple of the drive system of the voice coil motor are not strict, a proper average solution between the thrust ripple of the motor and the average thrust of the motor can be obtained in the system, which not only reduces the thrust ripple, but also remains the average thrust.

The accuracy and rationality of the theoretical analysis are verified through the simulation test. For the same voice coil motor, when the scheme in the embodiment is adopted and A=9, the simulation waveform of the output thrust of the system is shown in FIG. 11A through FIG. 11C.

Figure 11A:
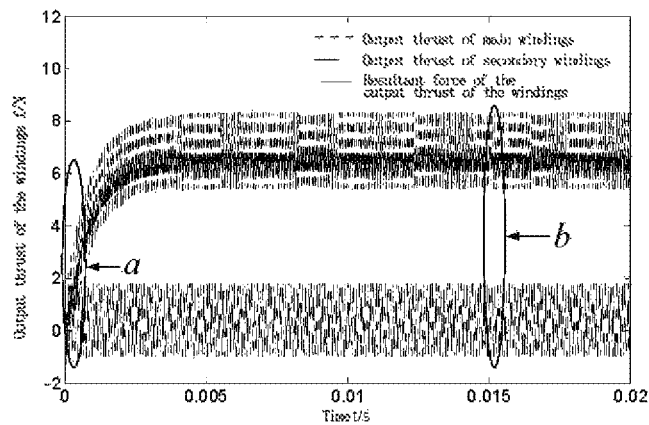
Figure 11B:
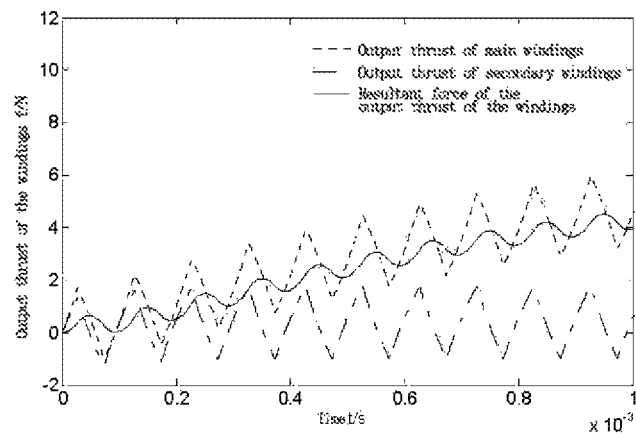
Figure 11C:
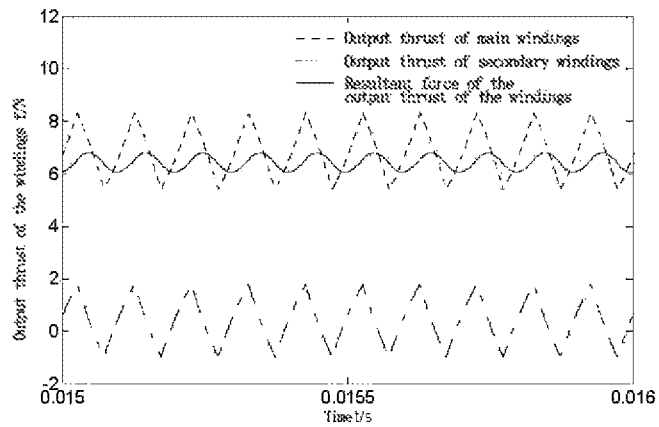
Figure 12A:
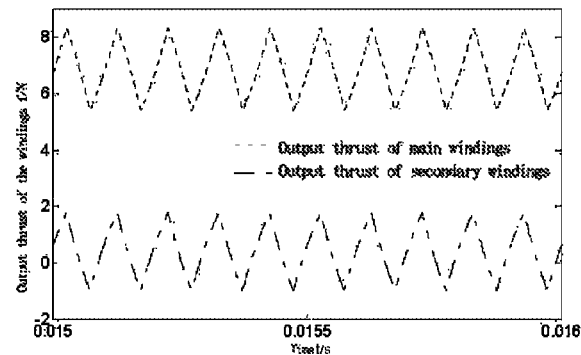
FIG. 12A is a partial enlarged view of the thrust simulation waveform of the main windings and the secondary windings
Figure 12B:
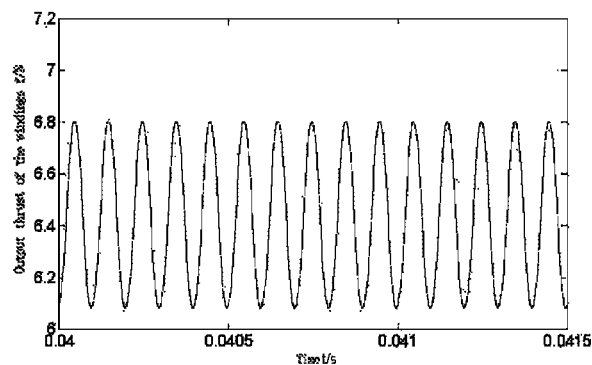
FIG. 12B is a partial enlarged view of the resultant force of the output thrust of the windings
Figure 13:
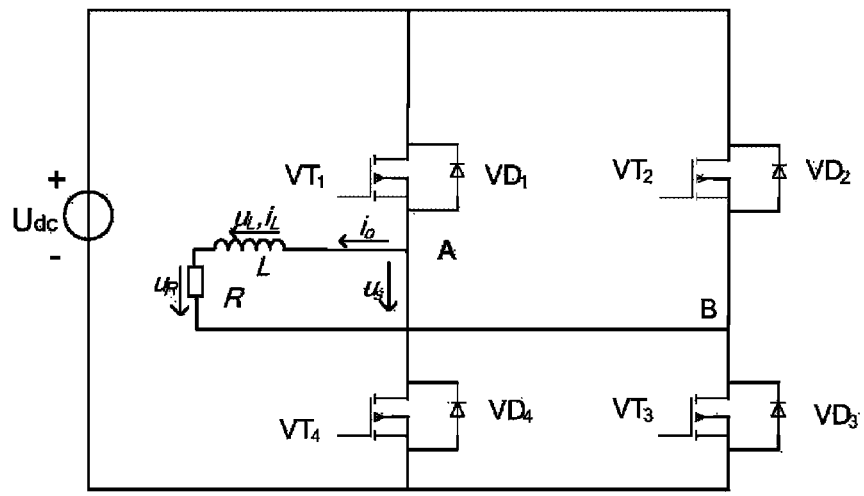
FIG. 13 is a structure diagram of the control system of the voice coil motor in the traditional PWM power converter scheme
Figure 14A:
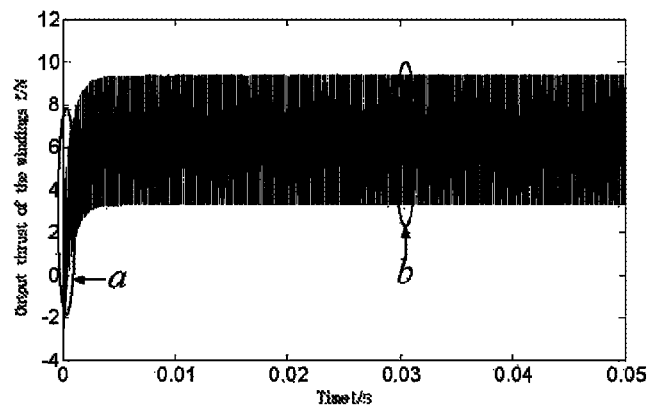
FIG. 14A is a simulation diagram of the output thrust of the servo drive system of the original voice coil motor below 10 kHz.
Figure 14B:
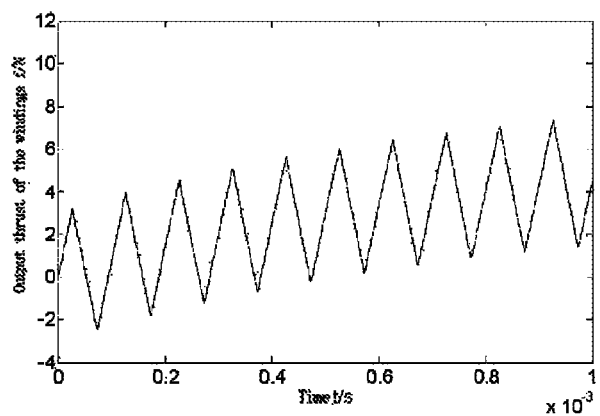
FIG. 14B is a partial enlarged view of the simulation results of the output thrust of the system between 0 and 0.001 s.
Figure 14C:
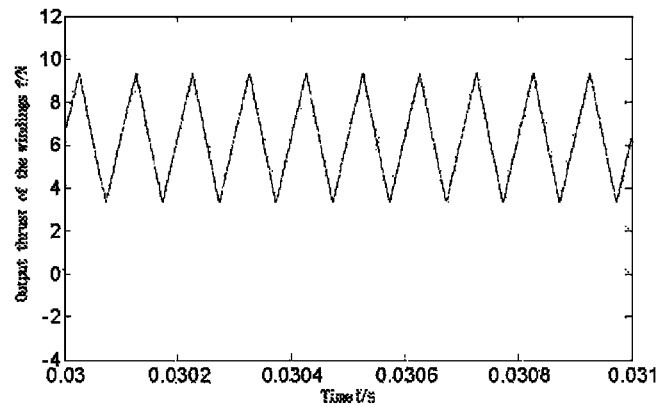
FIG. 14C is a partial enlarged view of the simulation results of the output thrust of the system between 0.03 s and 0.031 s
Figure 15A:
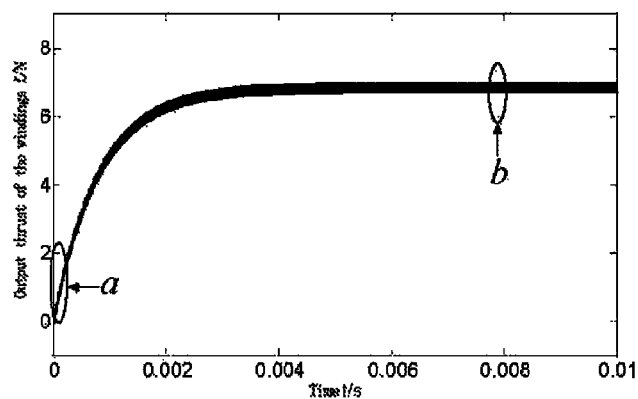
FIG. 15A is a simulation diagram of the output thrust of the servo drive system of the original voice coil motor below 200 kHz.
Figure 15B:
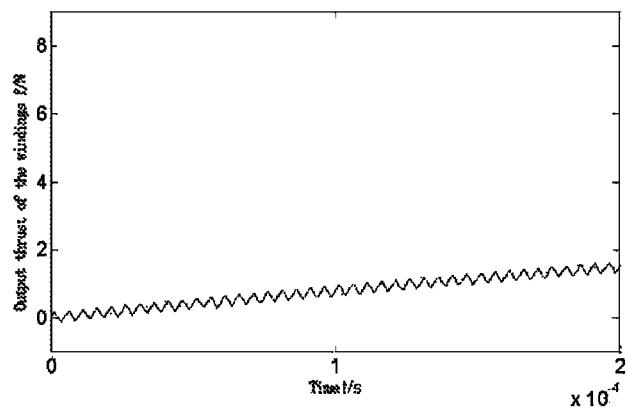
FIG. 15B is a partial enlarged view of the simulation results of the output thrust of the system between 0 and 0.0002 s.
Figure 15C:
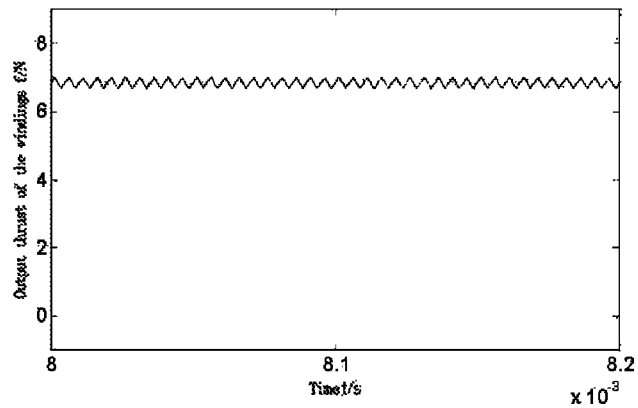
FIG. 15C is the partial enlarged view of the simulation results of the output thrust of the system between 0.008 s and 0.0082 s.

As shown in FIG. 11A through FIG. 11C, after the resistance $R_2$ of the secondary windings 200 is adjusted, the average thrust of the whole system is obviously improved. As shown in partial enlarged views FIG. 12A and FIG. 12B, the thrust ripple range of the main windings is 8.3253N-5.4091N, the average output thrust of the main windings is 6.8672N, the thrust ripple value is 2.9162N, but the fluctuation range of the resultant force of the thrust of the main windings and the secondary windings is 6.8025N-6.0842N, the average value of the resultant force of the output thrust of the windings is 6.4434N, the fluctuation value of the resultant force of the thrust is 0.7183N, the thrust ripple is reduced to 75.37%, and the resultant force of the average output thrust of the windings is 93.83% of the average output thrust of the main windings, so the designed performances of the dual-winding thrust compensation system are realized, the accuracy and rationality of the theoretical analysis in the application scheme above is verified.

It is observed that after the resistance $R_2$ of the secondary windings 200 is adjusted, the compensation effect of the thrust ripple of the dual-winding thrust compensation system is reduced, but the average output thrust of the dual-winding thrust compensation system is obviously improved, which is 6.85 times larger than the average output thrust in the embodiment and then adapts to the servo application fields of which requirements on the thrust ripple are not strict.

In conclusion, the embodiments are better ones in this invention only, and not used to limit the implementation scope of the invention. All changes and decorations done within the patent application scope belong to the technical field of the invention.

Seen from the analysis of the embodiment 1 above, in the embodiment 1, the average output thrust of the motor is obviously reduced while the thrust ripple of the voice coil motor is precisely compensated. When the requirements of the thrust ripple required by the servo system of the voice coil motor are not strict, the embodiment 2 can be adopted, the average output thrust of the system can be improved by adjusting the resistance of the secondary windings, but the consequences are that the compensation effect of the thrust ripple applied by the secondary windings is reduced, and the thrust ripple of the servo system is increased.

The invention claimed is:

1. A thrust compensation system comprising:
a switch drive circuit of main windings of a voice coil motor that is powered by a first controlled voltage source to drive the main windings adopted as the main working windings of the voice coil motor and used for providing the output electromagnetic force required by a driving system of the voice coil motor in work;
a switch drive circuit of secondary windings of the voice coil motor that is powered by a second voltage source to drive the secondary windings adopted as compensation windings and used for providing the thrust ripple opposite to the main windings to compensate the thrust ripple of the main windings and keep the resultant force of the output of the main windings and the secondary windings of the voice coil motor constant;
wherein the voltages $U_{dc1}$ and $U_{dc2}$ of the first and second controlled voltage sources of the main windings and the second windings are configured as $$U_{dc2} = \frac{\frac{K_{f1}}{K_{f2}} \cdot L_2 + M}{L_1 + \frac{K_{f1}}{K_{f2}} \cdot M} U_{dc1}$$

wherein the parameters of the main windings and the second windings meet the following relation:

$$R_2 = R_1 \frac{L_2 + \frac{K_{f2}}{K_{f1}} \cdot M}{L_1 + \frac{K_{f1}}{K_{f2}} \cdot M}$$

wherein:
$U_{dc1}$ stands for the voltage value of a power supply of the drive circuit of the main windings;
$U_{dc2}$ stands for the voltage value of a power supply of the drive circuit of the secondary windings;
$R_1$ stands for the resistance value of the main windings;
$R_2$ stands for the resistance value of the secondary windings;
$L_1$ stands for the self-inductance value of the main windings;
$L_2$ stands for the self-inductance value of the secondary windings;
$M$ stands for the mutual inductance value of the main windings and the secondary windings;
$K_{f1}$ stands for the thrust coefficient of the main windings; and
$K_{f2}$ stands for the thrust coefficient of the secondary windings.

2. The thrust compensation system as claimed in claim 1, wherein $R_2$ is adjustable.

3. The thrust compensation system as claimed in claim 2, wherein the thrust ripple of the system can be reduced while the average thrust can be kept at the same time.

4. The thrust compensation system as claimed in claim 1, wherein $R_2$ is proportional to $R_1$.

5. The thrust compensation system as claimed in claim 1, wherein the ratio of $R_2$ of the secondary windings to $R_1$ of the main windings is proportional to the ratio of $L_2$ to $L_1$.

6. The thrust compensation system as claimed in claim 5, wherein the proportion of the ratio of $R_2$ to $R_1$ to the ratio of $L_2$ to $L_1$ is larger than 1.

7. The thrust compensation system as claimed in claim 1, wherein the drive circuits of the main windings and the secondary windings are H-shaped full-bridge drive circuits.

8. The thrust compensation system as claimed in claim 1, wherein the system is for a dual-winding voice coil motor, which is used for driving the voice coil motor having the main windings and secondary windings, wherein the secondary windings of the voice coil motor are between each pair of the main windings.

9. A thrust compensation system of a dual-winding voice coil motor, including a voice coil motor, wherein the voice coil motor includes main windings, a magnetic steel and a permanent magnet, and further includes secondary windings arranged between a pair of main windings of the voice coil motor;
wherein the main windings are the main working windings of the voice coil motor, driven by a switch drive circuit of the main windings which is powered by an independent controlled voltage source, and used for providing the electromagnetic force required by the driving system of the voice coil motor in work; the secondary windings are compensation windings, driven by a switch drive circuit of the secondary windings which is powered by another independent controlled voltage source, and used for providing the thrust ripple opposite to the main windings so as to compensate the thrust ripple of the main windings and then keep the resultant force of the output of the main windings and the secondary windings of the voice coil motor in constant;
wherein the voltages $U_{dc1}$ and $U_{dc2}$ of the controlled voltage sources of the main windings and the second windings are configured as $$U_{dc2} = \frac{\frac{K_{f1}}{K_{f2}} \cdot L_2 + M}{L_1 + \frac{K_{f1}}{K_{f2}} \cdot M} U_{dc1}$$

wherein the parameters of the secondary windings meet the following relation:

$$R_2 = R_1 \frac{L_2 + \frac{K_{f2}}{K_{f1}} M}{L_1 + \frac{K_{f1}}{K_{f2}} M}$$

wherein:
$U_{dc1}$ stands for the voltage value of the power supply of the drive circuit of the main windings;
$U_{dc2}$ stands for the voltage value of the power supply of the drive circuit of the secondary windings;
$R_1$ stands for the resistance value of the main windings;
$R_2$ stands for the resistance value of the secondary windings;
$L_1$ stands for the self-inductance value of the main windings;

$L_2$ stands for the self-inductance value of the secondary windings;

M stands for the mutual inductance value of the main windings and the secondary windings;

$K_{f1}$ stands for the thrust coefficient of the main windings; and $K_{f2}$ stands for the thrust coefficient of the secondary windings.

10. The thrust compensation system of the dual-winding voice coil motor as claimed in claim 9, wherein the main windings and the secondary windings of the voice coil motor are shaped of layered type or joint filling type.

11. The thrust compensation system of the dual-winding voice coil motor as claimed in claim 10, wherein the secondary windings are enclosed between the two layers of the main windings, and the main windings at the internal side are enclosed on the external layer of the winding pillar.

12. The thrust compensation system of the dual-winding voice coil motor as claimed in claim 10, wherein the secondary windings are clamped between the upper main winding and the lower main winding, and the winding pillar passes through the upper main winding, the secondary winding and the lower main winding from upside to downside.

13. The thrust compensation system of the dual-winding voice coil motor as claimed in claim 9, wherein the main windings, the secondary windings and the winding pillar are encapsulated in a primary winding support plate through epoxy glue;

wherein the primary winding support plate is supported through a primary support pedestal; and wherein a secondary magnetic steel is connected with a secondary support structure through a yoke plate.

* * * * *